United States Patent [19]
Koshimo

[11] Patent Number: 4,982,819
[45] Date of Patent: Jan. 8, 1991

[54] HYDRODYNAMIC RETARDER

[75] Inventor: Masahiko Koshimo, Neyagawa, Japan

[73] Assignee: Kabushiki Kaisha Daikin Seisakusho, Osaka, Japan

[21] Appl. No.: 391,610

[22] PCT Filed: Nov. 25, 1988

[86] PCT No.: PCT/JP88/01199

§ 371 Date: Jul. 20, 1989

§ 102(e) Date: Jul. 20, 1989

[87] PCT Pub. No.: WO89/05410

PCT Pub. Date: Jun. 15, 1989

[30] Foreign Application Priority Data

Dec. 3, 1987 [JP] Japan .................. 62-306567

[51] Int. Cl.⁵ .............................. F16D 52/06
[52] U.S. Cl. .................... 188/296; 188/294
[58] Field of Search ........... 188/296, 293, 294, 290; 192/3.21, 3.23, 3.24, 3.29

[56] References Cited

U.S. PATENT DOCUMENTS

| | | | |
|---|---|---|---|
| 3,072,222 | 1/1963 | Kugel | 188/296 |
| 3,952,508 | 4/1976 | Bopp | 188/296 X |
| 4,194,600 | 3/1980 | Armasow et al. | 188/296 |

FOREIGN PATENT DOCUMENTS

| | | | |
|---|---|---|---|
| 1942475 | 3/1971 | Fed. Rep. of Germany | 188/296 |
| 2209446 | 9/1973 | Fed. Rep. of Germany | 188/296 |
| 2509005 | 9/1976 | Fed. Rep. of Germany | 188/296 |
| 2135268 | 8/1978 | Fed. Rep. of Germany | 188/296 |
| 38-20510 | 10/1963 | Japan . | |
| 48-4461 | 2/1973 | Japan . | |
| 48-35911 | 10/1973 | Japan . | |
| 58-186227 | 10/1983 | Japan . | |
| 608686 | 5/1978 | U.S.S.R. | 188/294 |
| 1343146 | 10/1987 | U.S.S.R. | 188/296 |
| 589790 | 6/1947 | United Kingdom | 188/296 |

Primary Examiner—Matthew C. Graham
Attorney, Agent, or Firm—Armstrong, Nikaido, Marmelstein, Kubovcik & Murray

[57] ABSTRACT

A hydrodynamic retarder suitable for use as a supplementary brake on trucks consists of a rotor wheel 20 fixed to an output shaft and a stator wheel 21. Movable blades 24 are attached to edges of blades 30 of the stator wheel 21 facing toward the rotor wheel 20. The movable blades 24 are biased by spring members to prevent air flowing into the stator wheel 21, but allow working oil to flow into the stator wheel 21. The movable blades 24 and spring members are provided internally of a torus defined by the stator wheel and provide an efficient hydrodynamic retarder of reduced weight and cost.

5 Claims, 4 Drawing Sheets

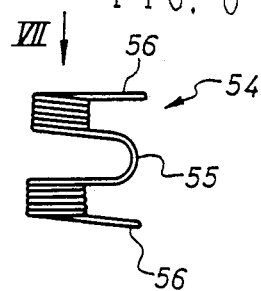
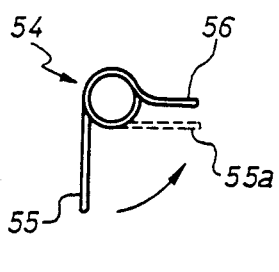
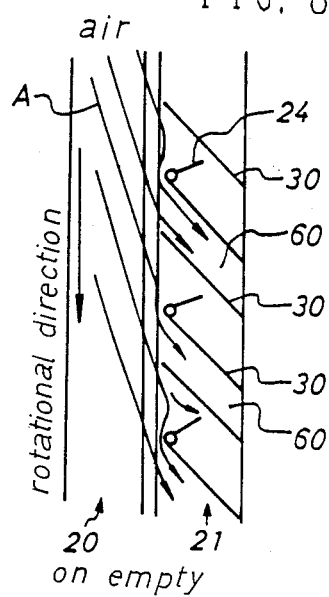
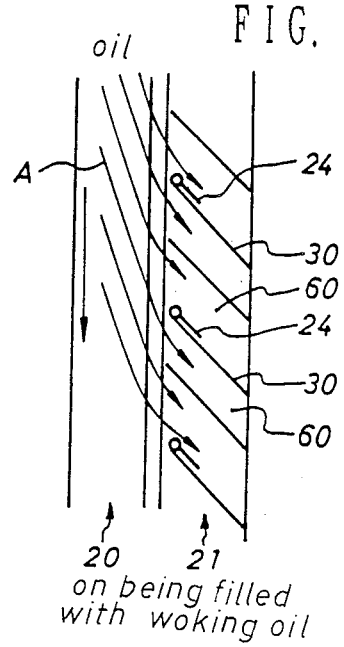
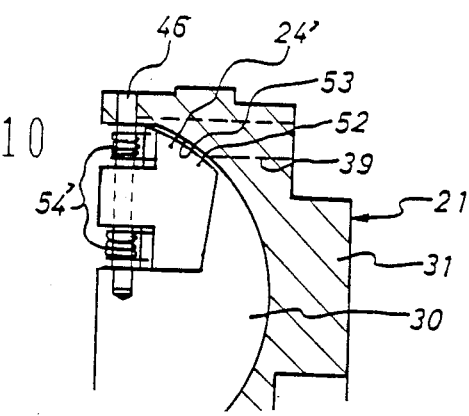

HYDRODYNAMIC RETARDER

TECHNICAL FIELD

The present invention relates to a hydrodynamic retarder which is used, for example, as a supplementary brake of a large size motor vechile.

BACKGROUND OF THE INVENTION

1. Prior Art

Traditionally, a supplementary brake is provided in a large size motor vehicle in addition to a main brake for directly braking wheels. A hydrodynamic retarder is one kind of supplementary brake. In the field of this hydrodynamic retarder, the following art is published. Namely, the retarder is provided with a rotor wheel having blades and a stator wheel having blades. The rotor wheel is fixed to a driving shaft of a vehicle and is able to rotate. The stator wheel is fixed to a housing connected with a vehicle body. When the housing is filled with working oil, the working oil flows from the rotor side into the stator side with whirls colliding in the stator wheel so that a retardation or brake power is generated with the rotor wheel.

Moreover, Japanese publication No. 38-20510 or GB Patent No. 1,365,670 founded on U.S. Pat. No. 3,072,222, describe art which prevents air flowing into the stator wheel when the brake is empty of working oil. As a result, power output losses by air whirls are eliminated.

The Japanese art, however, requires a large shutter blade and an actuator to open and shut the blades. The GB Patent is provided with a device outside of a torus of the retarder.

2. Object of the Invention

An object of the present invention is to simplify a hydrodynamic retarder.

Another object is to provide a hydrodynamic retarder which will make it possible to eliminate the air whirl losses with a retarder empty of working fluid.

STRUCTURE OF THE INVENTION

In order to accomplish the above objects, in the present invention, a rotor wheel is connected to an output shaft, a stator wheel is fixed to a housing, they are arranged in the housing to face each other, the housing is capable of being filled with and discharging working oil, the housing is filled with air when the retarder is empty of working oil, movable blades are attached movably to edges of stator blades facing the rotor wheel, and the movable blades are forced by coil springs to prevent the flow of air and allow the flow of working oil into the stator wheel.

When the housing is empty, the movable blades automatically prevent the air from flowing in the stator wheel by the springs. When the housing is filled with the working oil, the movable blades open against the forces of the springs by moving energy of the working oil.

The working oil, when it flows into the stator wheel, overcomes the forces of the springs, so that a large braking force is generated.

The retarder is miniaturized and made compact because the movable blades and the torsion springs are accommodated in a torus of the retarder. Increased weight and cost are thus eliminated and space required for the retarder is saved.

Moreover, the movable blades are able to open and close automatically by means of the force of the torsion springs and thus, the operation of the retarder becomes highly reliable.

BRIEF DESCRIPTION OF THE DRAWINGS

FIG. 6 is a front view of a torsion spring;

FIG. 7 is a plan view taken in the direction of the arrow VII in FIG. 6;

FIG. 8 is a diagram explanatory of the operation when a retarder is empty;

FIG. 9 is a diagram explanatory of the operation when the retarder is filled with working oil; and FIG. 10 is a longitudinal sectional view of another embodiment of the present invention.

BEST MODE FOR CARRYING OUT THE INVENTION

Embodiment 1

Figure 1:
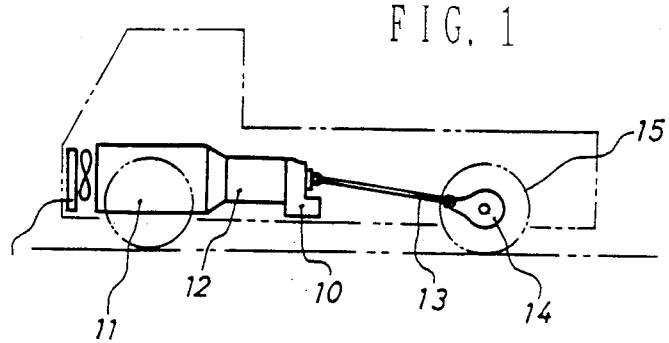
FIG. 1 is a sketch of a large size motor vehicle such as a truck provided with a hydrodynamic retarder according to the present invention.

In FIG. 1 showing a sketch of a large size truck provided with a hydrodynamic retarder according to the present invention, 10 indicates a hydrodynamic retarder. This hydrodynamic retarder 10 is disposed between a transmission 12 and a propeller shaft 13 in a driving system. The driving system consists of an engine 11, transmission 12, propeller shaft 13, a differential gear 14 and rear wheels 15. Power is transmitted from the engine 11, through the transmission 12, the propeller shaft 13 and the differential gear 14, to the rear wheels 15.

Figure 2:
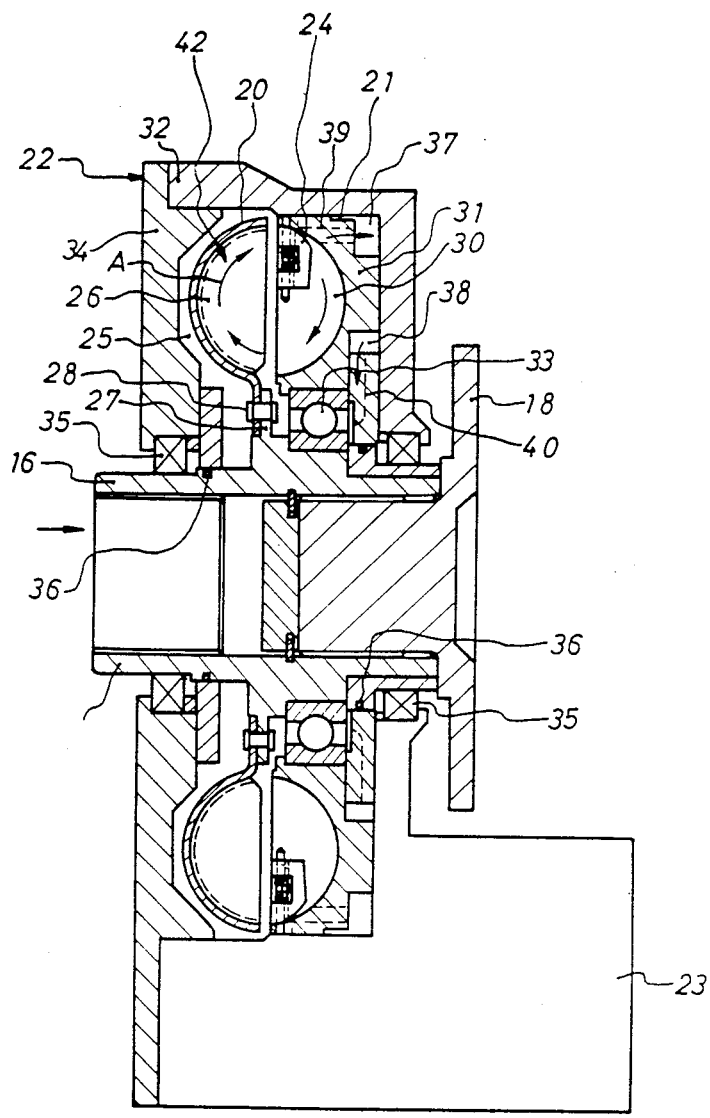
FIG. 2 is a longitudinal sectional view of the hydrodynamic retarder.

In FIG. 2, the hydrodynamic retarder 10 is disposed on a rear end of an output shaft 16 of the transmission 12. The propeller shaft (FIG. 1) is connected to a rear flange 18 of the output shaft 16. The retarder 10 consists of a rotor wheel 20, a stator wheel 21, a housing 22, an oil tank 23, movable blades 24, and so on.

The rotor wheel 20 consists of a shell 25, blades 26, a hub 27, and so on. The shell 25 is fixed to the hub 27 by means of rivets 28. The hub 27 is formed integral with the output shaft 16. The stator wheel 21 consists of blades 30, a shell 31, and so on. The stator wheel 21 faces toward the rotor wheel 20. The shell 31 of the stator wheel 21 is fixed to a rear housing part 32 of the housing 22. The stator wheel 21 is thus fixed to the housing 22. The blades 30 are provided with movable blades 24.

The output shaft 16 is fitted to the inner face of the shell 31 by means of a bearing 33. The housing 22 consists of said rear housing 32 and a front housing 33 by combining them. The oil tank 23 is fixed to an under portion of the housing 22. The oil tank 23 has an oil cooler (not shown). A packing 35 and a seal ring 36 are disposed between the housing 22 and the output shaft 16. An outlet 37 for working oil is opened on the outer portion of the shell 31. An inlet 38 for working oil is opened on the inner portion of the shell 31. The outlet 37 for working oil is connected to a passage 39 which is formed in the shell body. The passage 39 is connected to a torus 42 in the housing 22. The inlet 38 for working oil is connected to said torus 42 through a passage 40 and an inner space of the bearing 33. Therefore, the housing 22 is possible to be filled with or discharging of the working oil by opening or closing the inlet 37 and the outlet 38.

Figure 4:
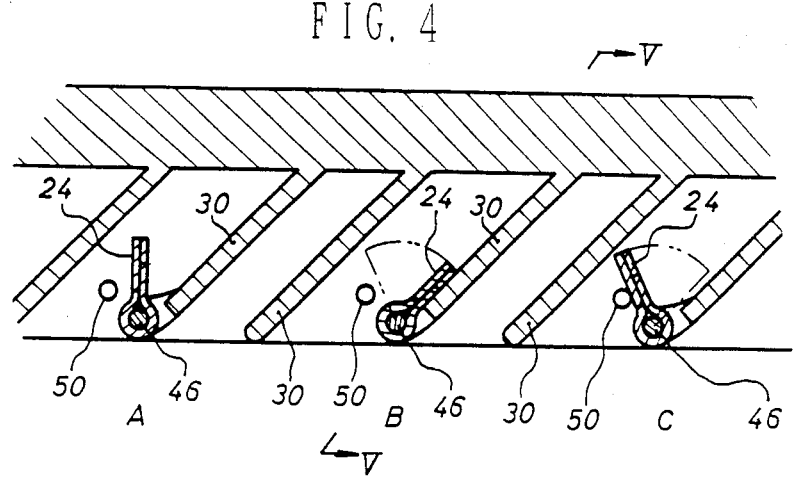
FIG. 4 is a sectional view taken along line IV—IV of FIG. 3.
Figure 3:
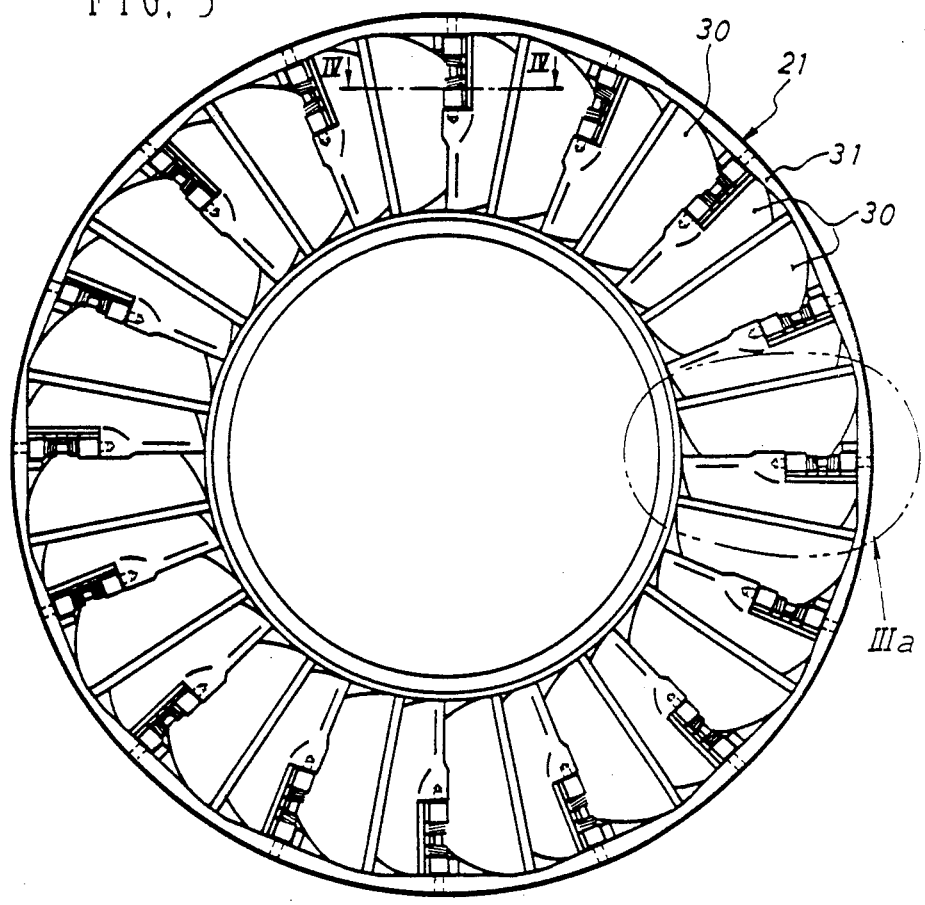
FIG. 3 is a front view of a stator wheel.
Figure 3A:
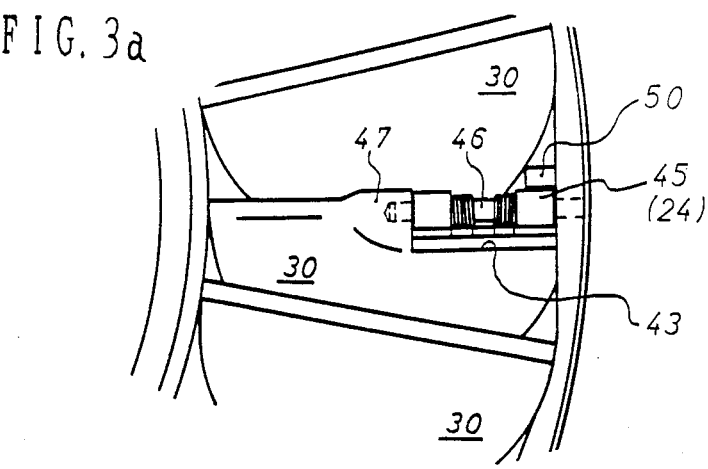
FIG. 3a is an enlarged view of a portion IIIa in FIG. 3.

In FIG. 3 showing the stator wheel 21, every other blade 30 is provided with a movable blade 24. Each of the movable blades 24 at its boss 45 (one side portion) is supported by a pin 46 to a notch 43 of the blade 30. Each of notches 43 is formed on the front end face of an outer peripheral portion of the blade 30. That is, notches 43 and the movable blades 24 are arranged on inlet portions of the blades 30 on which a fluid flowing in the torus 42 (FIG. 2) flows from the rotor wheel 20 to the stator wheel 21. The ends of each of the pins 46 are fitted to the shell 31 and the boss 47. The movable blades 24, shown in FIG. 4, are made of sheet metal. Ranges of movement of the movable blades 24 are limited by means of stopper pins 50 fixed to the shell 31.

Figure 5:
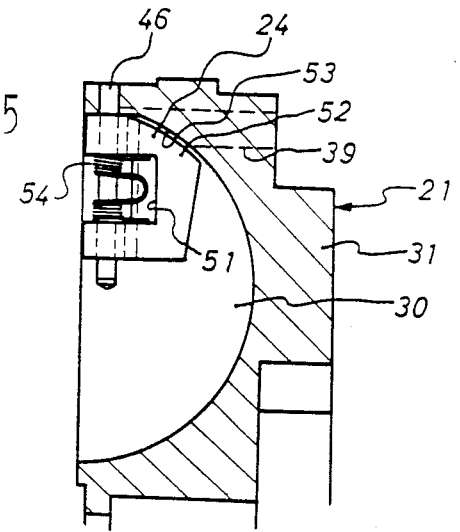
FIG. 5 is an enlarged view of a main portion of the stator wheel.

In FIG. 5, each of the movable blades 24 has a notch 51. The outer peripheral edge of each movable blade 24 is shaped to the contour of the inner face 53 of shell 31. Each of the pins 46 passing through the notches 51 is provided with a torsional spring 54 (spring members). An arched portion 55 and end portions 56 of each torsional spring 54, as shown in FIG. 6 and FIG. 7, spreads with free condition so that the arched portion 55 deflects to a position shown as a solid line. The end portions 56 of each of the torsion springs 54 are in contact with the edges of the notches 51. The arched portions 55 are in contact with the blades 30 so that the blades 24 are forced toward the stopper pins 50.

Spring force of the torsional springs 54 is set to operate as follows. In a condition where the retarder 10 is empty (not working), namely working oil is discharged form the passage 40 and air flows in direction of arrow A in FIG. 8, the spring force of the torsional springs 54 is larger than the fluid force of air and the blades 24 are spread against the fluid force by the torsional springs 54 to be in contact with the stopper pins 50 as shown in the C portion of FIG. 4.

On the other hand, in a condition where the passage 40 is filled with working oil, spring force of the torsion springs 54 is smaller than the fluid force of the working oil.

Therefore under conditions where the retarder 10 is in operation as shown by FIG. 4, the movable blades 24 are folded from a state as shown by A with low speed flow to a state as shown by B with high speed flow so as to abut against the blades 30 by fluid force. The function will be described as follows. When the retarder is empty, that is to say when the passage 40 is filled with air, the movable blades 24 spread so as to close the passages 60 between the blades 30 by the forces of the torsional springs 54, because the fluid force acting the movable blades 24 is a small force which is exerted by the light air. By closing every other passage 60, the air flow is disturbed as shown in FIG. 8, and the speed of the circulating fluid on a meridian surface decreases remarkably, so that air whirl losses by pump action of the rotor wheel 20 decrease. Therefore non-load rotating losses decrease remarkably.

When the retarder 10 is in braking, namely the torus 42 is filled with working oil, the large liquid force of the heavy working oil overcomes the spring forces of the torsional springs 54 to fold the movable blades 24 from the state A of FIG. 4 to the state B. Therefore the working oil, as shown by the arrow A in FIG. 9, flows into all of the passages 60 between the blades 30 without disturbance by the movable blades 24, and as a result, large braking forces are exerted.

Other Embodiments

In FIG. 10, each of the movable blades 24' is supported at its center by means of pin. Torsional springs 54' are disposed at both ends of the movable blades 24'.

Effect of the Invention

As above described, in the retarder of the present invention, movable blades 24 attached movably to the edges of blades 30 of a stator wheel 21 facing to a rotor wheel 20 are forced by means of coil spring members 54 so as to prevent air flowing into the stator wheel but allow working oil to flow into the stator wheel.

Therefore, the retarder is miniaturized and made compact because the movable blades and torsional springs of the retarder are accommodated in a torus. Increased weight and cost are thus eliminated and space required for the retarder is saved.

Moreover, the movable blades are able to open and close automatically by means of the force of the torsional springs, and thus the operation of the retarder becomes highly reliable.

Industrial Applicability

The hydrodynamic retarder of the present invention is most suitable for application as a supplementary brake of a motor vehicle, especially a large sized motor vehicle, because decreased weight and cost reductions are both accomplished.

I claim:

1. A hydrodynamic retarder for a motor vehicle comprising:
   a housing fixed to said vehicle,
   a stator wheel and a rotor wheel provided internally of said housing and facing each other to define a toroidal space therebetween,
   said rotor wheel being fixed for rotation with an output shaft of said motor vehicle,
   said stator wheel being fixed to said housing and including a plurality of first blades fixed to said stator wheel and having an edge facing said rotor wheel,
   a notch in said edge of selected ones of said first blades,
   a plurality of second blades with each of said second blades pivotally mounted in one of said notches of a first blade on a pin extending in the same direction as said edge of said first blade with one end of the pin seated in said first blade and a second end of said pin seated in said stator wheel,
   means for biasing said second blades to a first position to close passages between adjacent ones of said first blades to a low pressure fluid flow and movable in response to a higher pressure fluid flow to a second position permitting fluid flow between said adjacent ones of said first blades,
   a source of working fluid for providing said higher pressure fluid flow, and
   fluid passages between said source of working fluid and said rotor wheel and between said stator wheel and said source of working fluid to selectively pass said working fluid to said rotor wheel, whereby said plurality of second blades, said pins and said means for biasing said second blades are all provided internally of said toroidal space defined by said stator wheel.

2. A hydrodynamic retarder as defined by claim 1, wherein each of said pins is disposed to transverse its respective notch in one of said first blades with a longitudinal axis of said pin parallel to said edge of said first blade facing said rotor wheel.

3. A hydrodynamic retarder as defined by claim 1, wherein each of said second blades is integrally formed with a boss having a bore therethrough and each of said second blades is pivotally mounted on a pin by means of said bore.

4. A hydrodynamic retarder ad defined by claim 1, wherein said means for biasing each of said second blades is a torsion spring having a first portion disposed for abutment with the first blade, a second portion disposed for abutment with said second blade and a spirally wound portion intermediate said first and second portion of said torsion spring and said torsion spring is mounted to a pin with the pin received internally of said spirally wound intermediate portion.

5. A hydrodynamic retarder as defined by claim 1, wherein said selected ones of said first blades comprise alternate ones of said first blades.

* * * * *